Mar. 27, 1923.

C. W. SAALBURG

PICTURE

Filed Feb. 7, 1917

1,449,914

INVENTOR
Charles W. Saalburg
BY
Prindle, Wright & Small
ATTORNEYS

Patented Mar. 27, 1923.

1,449,914

UNITED STATES PATENT OFFICE.

CHARLES W. SAALBURG, OF NEW YORK, N. Y., ASSIGNOR TO ANIMATED PICTURE PRODUCTS COMPANY, OF NEW YORK, N. Y., A CORPORATION OF DELAWARE.

PICTURE.

Application filed February 7, 1917. Serial No. 147,274.

*To all whom it may concern:*

Be it known that I, CHARLES W. SAALBURG, a citizen of the United States, and residing at New York, in the county of Queens and in the State of New York, have invented a certain new and useful Improvement in Pictures, and do hereby declare that the following is a full, clear, and exact description thereof.

My invention relates particularly to pictures so arranged as to give the effect of motion, or change, when viewed.

The object of my invention is to provide a picture which may be of large size, and therefore, of such a nature that different portions thereof are viewed at very different angles, but which is provided with inserts covering restricted areas, each of which areas is viewed substantially at a single angle, and each of which areas gives the effect of motion or change when the position of the observer changes. It has been found that when it is sought to make large movable or changeable pictures formed by the location of a series of lines in front of a composite picture made up of alternating lines taken from two or more different pictures, an entire picture of large size made in this manner will not change at once when the position of the observer changes, as the angles of the different portions of the picture to the eye are different. This is due to the fact that the different portions of the pictures located behind the lines all occupy the same angle with regard to said lines, while from any given position of the observer the different portions of the picture are located at different angles to the eye of the observer. This difficulty is overcome by locating the movable or changeable portions of the picture only in restricted areas, in accordance with my invention.

While my invention is capable of embodiment in many different forms, for the purpose of illustration I have shown only one form thereof in the accompanying drawings, in which—

Figure 1:
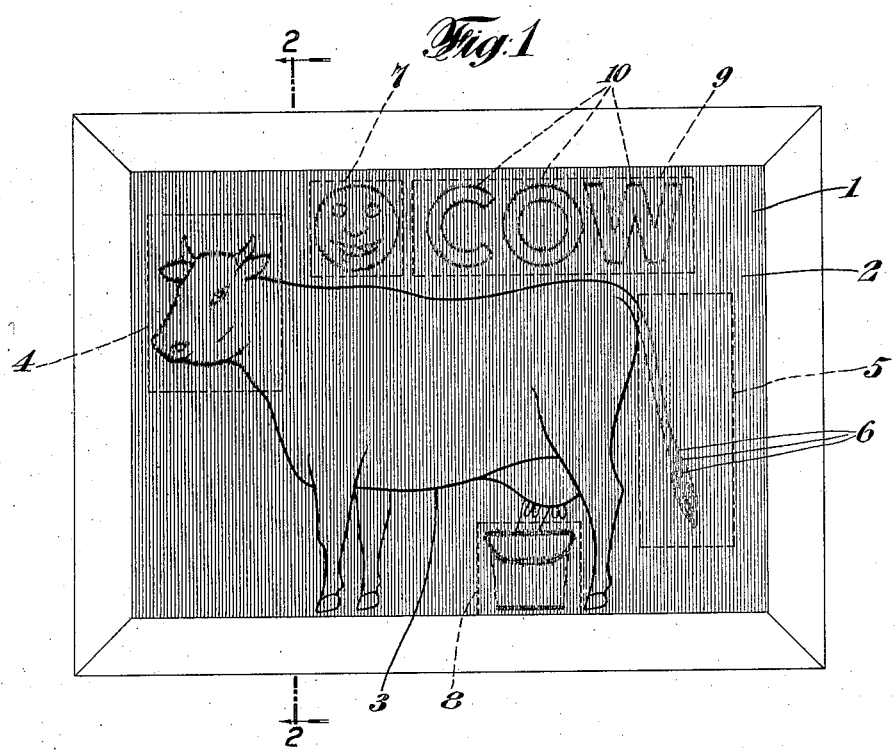
Fig. 1 is an elevation of a picture made in accordance with my invention.
Figure 2:
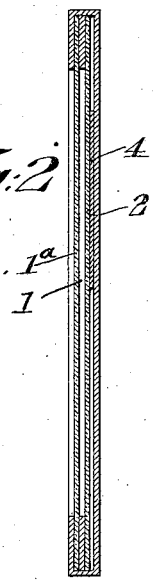
Fig. 2 is a horizontal section through the same at line 2—2.

In the drawings I have shown a device comprised of a large picture 1, located behind a transparent line screen 1ª, having a back-ground 2 including a view of any desired objects, and which is not intended to move or change when the picture is viewed. In the back-ground there is shown the figure, 3, of a cow. If for example, it is desired to have the head and the tail of the cow move, said picture is provided with inserts 4 and 5 made up of a plurality of alternating lines 6 taken from two different pictures showing the head and tail of the cow in two different positions. In the background there may also be provided similar inserts 7 and 8 indicating the moon and a milk pail. which may be arranged so as to make the face of the moon move and make the milk pail turn over. Furthermore, there may be provided a similar changeable insert 9 containing letters 10 adapted to change their position in a similar way.

Figure 3:
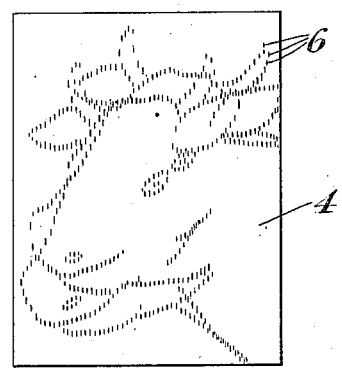
Fig. 3 is an enlarged view of one of the inserts.

When the composite picture made as above described is viewed from any given angle, the back-ground 2 is readily seen, and on the back-ground the immovable figure 3 of the cow is also readily seen, and when the composite picture is viewed from a certain angle, the head and tail of the cow, as well as the pail, the moon and the word "Cow" will be seen in one position, while if the position of the observer is shifted the head, tail, bucket, moon and word "Cow" will be seen in another position, so that by the shifting of the position of the observer in this manner the parts of the picture contained in these inserts will be seen to move. However, inasmuch as each of the inserts comprises only a restricted area of the larger picture, the whole of this restricted area can only be seen in one position at a given time by the observer, which would not be the case if the movable insert covered a larger portion of the entire picture. If the entire large picture were made to be movable in this manner, an unpleasant effect would be produced owing to the fact that the different portions of the picture are not changed or moved together owing to the different angular positions of the different parts of the same to the line of vision. By means of my invention this disadvantage is obviated, and the picture at all times assumes a natural appearance throughout its entire area.

While I have described my invention above in detail, I wish it to be understood that many changes may be made therein without departing from the spirit of my invention.

I claim:—

1. A picture comprising a view which is non-changeable when presented at different angles to an observer, an insert in said picture and means whereby only the view presented by said insert changes when the angle of the observer to the insert changes.

2. A picture comprising a large view which is non-changeable from different view points of an observer, an insert in said picture depicting a portion of the picture shown by the large view, and means whereby only the view presented by said insert changes when the angle of the observer to the insert changes, to produce the effect of motion between the view shown on the insert and the large view.

3. A picture which is non-changeable having an insert therein, only said insert comprising a plurality of sets of alternating lines taken from a plurality of pictures, and a line screen located in front of the insert.

4. A large picture which is non-changeable having an insert of restricted area therein, only said insert comprising a plurality of sets of alternating lines taken from a plurality of pictures, and a line screen located in front of the insert.

In testimony that I claim the foregoing I have hereunto set my hand.

CHARLES W. SAALBURG.